United States Patent
Ha et al.

(10) Patent No.: US 9,609,365 B2
(45) Date of Patent: Mar. 28, 2017

(54) APPLICATION EXECUTION ON A SERVER FOR A TELEVISION DEVICE

(71) Applicant: KT Corporation, Seongnam-si, Gyeonggi-do (KR)

(72) Inventors: Ji-hoon Ha, Gwacheon-si (KR); Dong-hoon Kim, Yongin-si (KR); Mi-jeom Kim, Anyang-si (KR); Gyu-tae Baek, Seoul (KR); Yoon-bum Huh, Seoul (KR)

(73) Assignee: KT Corporation, Seongnam-si (KR)

( * ) Notice: Subject to any disclaimer, the term of this patent is extended or adjusted under 35 U.S.C. 154(b) by 201 days.

(21) Appl. No.: 14/157,725

(22) Filed: Jan. 17, 2014

(65) Prior Publication Data
US 2014/0201794 A1    Jul. 17, 2014

(30) Foreign Application Priority Data
Jan. 17, 2013 (KR) .................. 10-2013-0005300

(51) Int. Cl.
| H04N 21/214 | (2011.01) |
| H04N 21/258 | (2011.01) |
| H04N 21/2662 | (2011.01) |
| H04N 21/435 | (2011.01) |
| H04N 21/4402 | (2011.01) |
| H04N 21/45 | (2011.01) |
| H04N 21/472 | (2011.01) |

(Continued)

(52) U.S. Cl.
CPC ....... *H04N 21/214* (2013.01); *H04N 21/2355* (2013.01); *H04N 21/25833* (2013.01); *H04N 21/4355* (2013.01); *H04N 21/440245* (2013.01); *H04N 21/4516* (2013.01); *H04N 21/478* (2013.01); *H04N 21/47202* (2013.01); *H04N 21/658* (2013.01); *H04N 21/8173* (2013.01)

(58) Field of Classification Search
CPC .......... H04N 21/214; H04N 21/25833; H04N 21/2662; H04N 21/4355; H04N 21/440245; H04N 21/4516
See application file for complete search history.

(56) References Cited

U.S. PATENT DOCUMENTS

| 2003/0018971 A1* | 1/2003 | McKenna, Jr. ...... H04N 21/462 725/40 |
| 2006/0195884 A1* | 8/2006 | van Zoest ......... H04L 29/06027 725/134 |

(Continued)

FOREIGN PATENT DOCUMENTS

| KR | 10-2012-0011578 A | 2/2012 |
| KR | 1020120009981 A | 2/2012 |

(Continued)

*Primary Examiner* — Ricky Chin
(74) *Attorney, Agent, or Firm* — Brundidge & Stanger, P.C.

(57) ABSTRACT

In at least one example embodiment, a system may include a television device configured to: transmit a request to execute an application; and a server configured to: execute the application that uses at least one function of the television device to generate an image; transmit the generated image to the television device; and transmit a request to execute the at least one function of the television device, and wherein the television device is further configured to: execute the requested function of the television device and transmit a result of the execution to the server.

20 Claims, 8 Drawing Sheets

(51) Int. Cl.
  *H04N 21/478*  (2011.01)
  *H04N 21/81*  (2011.01)
  *H04N 21/235*  (2011.01)
  *H04N 21/658*  (2011.01)

(56) References Cited

U.S. PATENT DOCUMENTS

| | | | | |
|---|---|---|---|---|
| 2010/0064335 A1* | 3/2010 | Jenkin | ............... | H04N 21/443 |
| | | | | 725/110 |
| 2010/0106766 A1* | 4/2010 | Bailey | ............... | H04L 69/16 |
| | | | | 709/203 |
| 2012/0030706 A1* | 2/2012 | Hulse | ............... | H04N 21/2143 |
| | | | | 725/38 |
| 2013/0276015 A1* | 10/2013 | Rothschild | ......... | H04N 21/2387 |
| | | | | 725/25 |
| 2015/0341686 A1* | 11/2015 | Wen | ............... | H04N 21/25808 |
| | | | | 725/109 |

FOREIGN PATENT DOCUMENTS

KR   10-2012-0085436 A   8/2012
KR   10-2012-0096741 A   8/2012

* cited by examiner

… (1) …

APPLICATION EXECUTION ON A SERVER FOR A TELEVISION DEVICE

TECHNICAL FIELD

The embodiments described herein pertain generally to a server that hosts or executes applications on behalf of a television device.

BACKGROUND

A television device may enable a user to not only watch television content or video on demand (VOD) but may also host plural applications.

SUMMARY

In one example embodiment, a system may include a television device configured to: transmit a request to execute an application; and a server configured to: execute the application that uses at least one function of the television device to generate an image; transmit the generated image to the television device; and transmit a request to execute the at least one function of the television device. The television device may be further configured to execute the requested function of the television device and transmit a result of the execution to the server.

In another example embodiment, a server may include a transceiver configured to receive a request to execute an application that uses at least one function of a television device; and middleware configured to: execute the application to generate an image of the application, and generate a request to execute the at least one function of the television device. The transceiver may be further configured to transmit, to the television device, the generated image and the request to execute the at least one function.

In yet another example embodiment, a television device may include a user input receiver configured to receive a user input to execute an application that utilizes at least one function of the television device; a transceiver configured to: transmit a request, to a server, to execute the application, receive, from the server, an image generated by execution of the application and a request to execute the at least one function of the television device, and a display unit configured to display the received image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
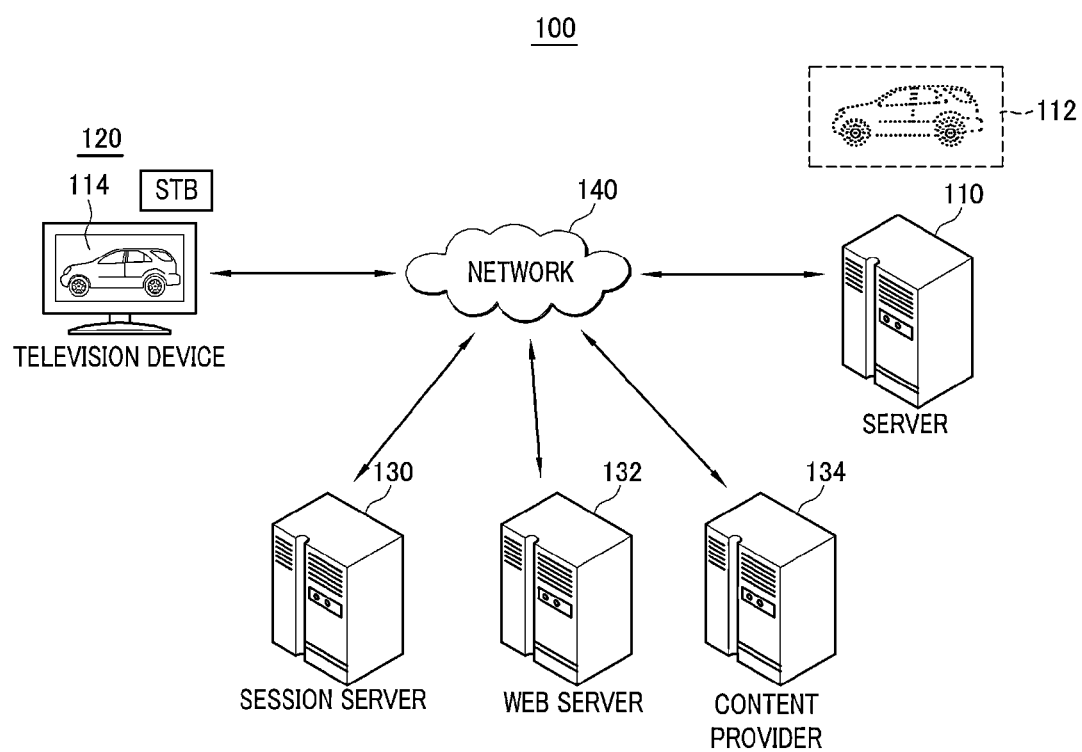
FIG. 1 shows an example system configuration in which a server hosts and/or executes an application on behalf of a television device, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration 100 in which a server 110 hosts and/or executes an application on behalf of a television device 120, in accordance with various embodiments described herein. As depicted in FIG. 1, system configuration 100 may include, at least, server 110; television device 120; a session server 130; a web server 132 that may be representative of one or more servers providing web pages; and a content provider 134 that may be representative of one or more servers operated by a content provider. At least two or more of server 110, television device 120, session server 130, web server 132, and content provider 134 may be communicatively connected to each other via a network 140.

Server 110, operated by a virtualization/cloud service provider, may be configured to execute an application to generate an image 112; and to transmit, to television device 120, generated image 112 for display thereof. Thus, server 110 may provide a user of television device 120 with an executed output of application on television device 120.

For example, server 110 may execute the application upon receiving a request to execute the application from television device 120, via session server 130 which may select server 110 from among a plurality of servers. In some embodiments, server 110 may directly receive the request to execute the application from television device 120 without going through session server 130.

As referenced herein, the application may be configured to use at least one function of television device 120 because the application cannot be executed without using the at least one function of television device 120. For example, if the application is designed or configured to capture a picture by using the camera coupled to television device 120, server 110 may transmit, to television device 120, a controlling signal for the camera to capture the picture. In this case, controlling of the camera or capturing the picture may be the function of television device 120.

The at least one function of television device 120 utilized by the application may be associated with broadcast content or video on demand (VOD) content to be played on television device 120. Further, the at least one function of television device 120 utilized by the application may be associated with a peripheral device, such as an external data storage device, a USB (Universal Serial Bus) flash drive, or a camera, etc., coupled to television device 120.

Server 110 may be further configured to communicatively interact with at least one of web server 132, and content provider 134, each of which may be operated by other service provider(s) from the virtualization/cloud service provider, to execute the application. For example, when server 110 receives, from television device 120 via session server 130, the request to execute the application, server 110 may interact with web server 132 to execute and/or host the application on a web-browser of server 110. Thus, server 110 may generate image 112 by executing and/or hosting the application. That is, television device 120 may not be configured to execute an application. Such shortcoming may pertain to hardware, software, or firmware. Regardless, the request is for server 110 to serve as an execution proxy on behalf of television device 120.

As a non-limiting example, if the executed or executing application includes any media content, such as broadcasting content, video on demand (VOD) content, image content, music content, various other media content, etc., server 110 may interact with content provider 134 to execute the application. That is, server 110 may transmit, to content provider 134, a request for at least some of the media content, and receive at least some of the requested media content from content provider 134.

Server 110 may be configured to receive a user input from television device 120. The received user input may be applied to execution of the application at or by server 110 to generate and transmit, to television device 120, a subsequent image. In some embodiments, server 110 may generate a plurality of successive images over a period of time, and combine the plurality of successive images to generate a video, and transmit the generate video to television device 120 by using a live streaming method.

Server 110 may be configured to transmit, to television device 120, a request to execute a function of television device 120. As referenced herein, execution of the at least one function may be required at or by server 110 to execute the application. For example, if the application is designed or configured to capture a picture by using the camera coupled to television device 120, server 110 transmit, television device 120, a request to instruct the camera coupled to television device 120 to display a preview image and capture the picture.

Server 110 may be further configured to encode at least a portion of image 112 so that television device 120, which may be a low-performance device, may display an encoded image 114, and transmit, to television device 120, encoded image 114. Thus, server 110 may enable television device 120 to display encoded image 114 without regard to hardware specifications of television device 120.

Television device 120 may refer to a display apparatus configured to play various types of media content, such as broadcasting content, video on demand (VOD) content, various other media content, etc. Television device 120 may further refer to at least one of an IPTV (internet protocol television), a DTV (digital television), a smart TV, a connected TV or a STB (set-top box), a mobile phone, a smart phone, a tablet computing device, a notebook computer, a personal computer or a personal communication terminal. Non-limiting examples of such display apparatuses may include PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals.

Further, in accordance with various embodiments described herein, television device 120 may be unable to host a web browser engine, thus television device 120 may be configured to receive, from server 110, encoded image 114, and to display encoded image 114. Examples of television device 120 may refer to a low-performance device including the IPTV or the STB. In some embodiments, if server 110 does not encode image 112, television device 120 may receive non-encoded image 112 and display non-encoded image 112.

Television device 120 may be further configured to receive, via a remote control device or a keyboard or a mouse (not illustrated), a user input representing a click or selection or other form of activation of an icon or a button displayed on image 114. Alternatively, or additionally, the received user input may represent an instruction to enter text: to search content or information regarding the text; or for a instant message service. Then, television device 120 may transmit the received user input to server 110, and receive a subsequent image corresponding to the user input from server 110.

If television device 120 receives a user input regarding a function of television device 120, television device 120 may transmit the user input regarding the function to server 110. Then, server 110 may transmit a request to execute the function to television device 120. The function of television device 120 may include play, stop, volume up and volume down functions for the broadcast content, or play, pause, stop, rewind, fast forward, volume up and volume down functions for the VOD content.

Non-limiting examples of the function of television device 120 may include capturing images using the camera coupled to television device 120, or browsing and accessing data included in the external data storage device or the USB flash drive coupled to television device 120.

Session server 130 may be configured to receive the request to execute the application from television device 120. Then, session server 130 may check status, such as unused computing resource, for each of a plurality of servers, and select server 110 from among the plurality of servers. Then, session server 130 may generate a session connecting television device 120 to selected server 110, and transmit the request to execute the application to selected server 110. After the session has been generated, server 110 may communicate to television device 120 via the generated session.

Web server 132, hosted by one or more web site providers, such as Naver™ Google™, or Bing™, etc., may refer to either hardware or software that helps to deliver, to server 110, web content that may be accessed through the Internet on server 110. For example, web server 132 may receive a request for a web page from server 110. Upon receiving the request, web server 132 may transmit, to server 110, the web content including, i.e., an "html" file corresponding to the requested web page. Further, web server 132, for example YouTube™, may transmit video content to server 110 in response to a corresponding request.

Content provider 134 may refer to one or more servers, operated by one or more content providers, which may be configured to receive, from server 110, a request for broadcasting content, video on demand (VOD) content, image content, music content, etc. The requested media content, which may be included in the web page, may be further transmitted the requested media content to server 110.

Network 140, which may be configured to communicatively couple server 110, television device 120 and external devices 130, may be implemented in accordance with any wireless network protocol, such as a mobile radio communication network including at least one of a 3rd generation (3G) mobile telecommunications network, a 4th generation (4G) mobile telecommunications network, any other mobile telecommunications networks, WiBro (Wireless Broadband Internet), Mobile WiMAX, HSDPA (High Speed Downlink Packet Access) or the like. Alternatively, network 140 may include at least one of a near field communication (NFC), radio-frequency identification (RFID) or peer to peer (P2P) communication protocol.

Thus, FIG. 1 shows an example system configuration 100 in which server 110 hosts and/or executes the application on behalf of television device 120, in accordance with various embodiments described herein.

Figure 2:
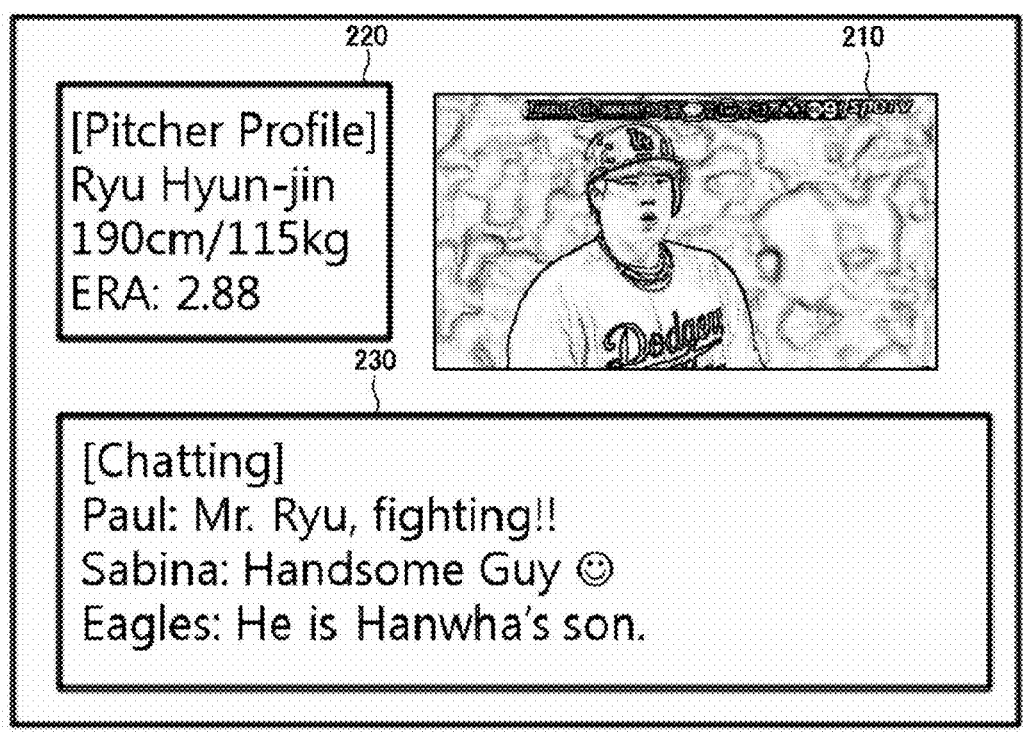
FIG. 2 shows an illustrative example of a generated image, in accordance with various embodiments described herein.

FIG. 2 shows an illustrative example of a generated image 200, in accordance with various embodiments described herein. As depicted in FIG. 2, the generated image may include a first area 210, a second area 220, and a third area 230.

As referenced herein, the application may be configured or designed to display broadcast content with additional information on the broadcast content, such as instant messages between users on a plurality of television devices.

In the non-limiting depicted example, first area 210 may be configured to display broadcast content regarding a baseball game, and second area 220 may be configured to display additional information on the baseball game or a player of the baseball game.

When a user of television device 120 inputs, to the application, a user input to increase the volume for the broadcast content via a remote control device for television device 120, television device 120 may transmit the transmitted user input to server 110. Then, server 110 may receive the user input from server 110, and transmit a request to turn up the volume to television device 120.

In the non-limiting depicted example, third area 230 may be configured to display an instant message between the users for a plurality of television devices. When the user enters a text message via a keyboard of television device 120 or via a voice-recognition component (not shown), television device 120 may transmit the text message to server 110. Then, server 110 may apply the received words to the application to display the words on third area 230.

In some embodiments, server 110 may be configured to encode at least a portion of the generated image 200. For example, server 110 may encode first area 210 that includes portions of the broadcast content for which frames per second (fps) exceed a predetermined threshold fps value. Further, server 110 does not encode second area 220 and third area 230 that include portions of the broadcast content for which frames per second (fps) does not exceed a predetermined threshold fps value.

Then, server 110 may transmit, to television device 120, encoded first area 210, non-encoded second area 220 and non-encoded third area 230, television device 120 may combine the encoded first area 210, non-encoded second area 220 and non-encoded third area 230 to display the combined image.

Thus, FIG. 2 shows an illustrative example of generated image 200, in accordance with various embodiments described herein.

Figure 3:
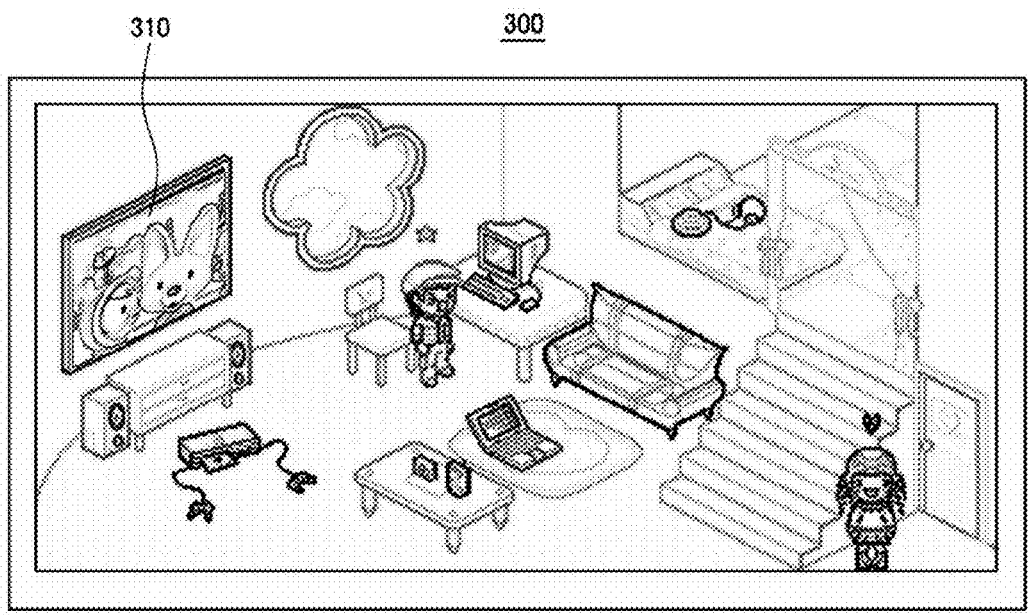
FIG. 3 shows another illustrative example of a generated image, in accordance with various embodiments described herein.

FIG. 3 shows another illustrative example of a generated image 300, in accordance with various embodiments described herein.

As referenced herein, server 110 may generate image 300 of the application, which is a virtual room custom-designed by a user. A first area 310 included in image 300 may play broadcast content (or video on demand (VOD) content).

Upon receiving a user input to turn on television device 120 via a remote control device, television device 120 may transmit the user input to server 110, and server 110 may transmit a request to play the broadcast content to television device 120. Then, television device 120 may play the broadcast content on first area 310.

To play the broadcast content on first area 310, server 110 may generate image 300 excluding first area 310 by blanking or cropping first area 310, and transmit the generated image 300 to television device 120. Television device 120 may display image 300 excluding first area 310 and display the broadcast content on first area 310 by resizing the broadcast content suitably to first area 310 and overlaying the resized broadcast content on first area 310.

In some embodiments, server 110 may receive an internet (http) address of the broadcast content from television device 120, and transmit a request for the broadcast content to content provider 134. Server 110 may receive the broadcast content from content provider 134, and resize the received broadcast content suitably to first area 310 because a size of the received broadcast content is larger than first area 310, and generate image 300 including first area 310. Then, television device 120 may receive image 300 from server 110, and display image 300 on television device 120.

When the user inputs a user input that changes the channel for the broadcast content via the remote control device to watch different broadcasting content, television device 120 may transmit the user input that changes the channel to server 110. Server 110 may receive the user input that changes the channel from television device 120, and transmit a request to change the channel to television device 120.

Thus, FIG. 3 shows another illustrative example of generated image 300, in accordance with various embodiments described herein.

Figure 4:
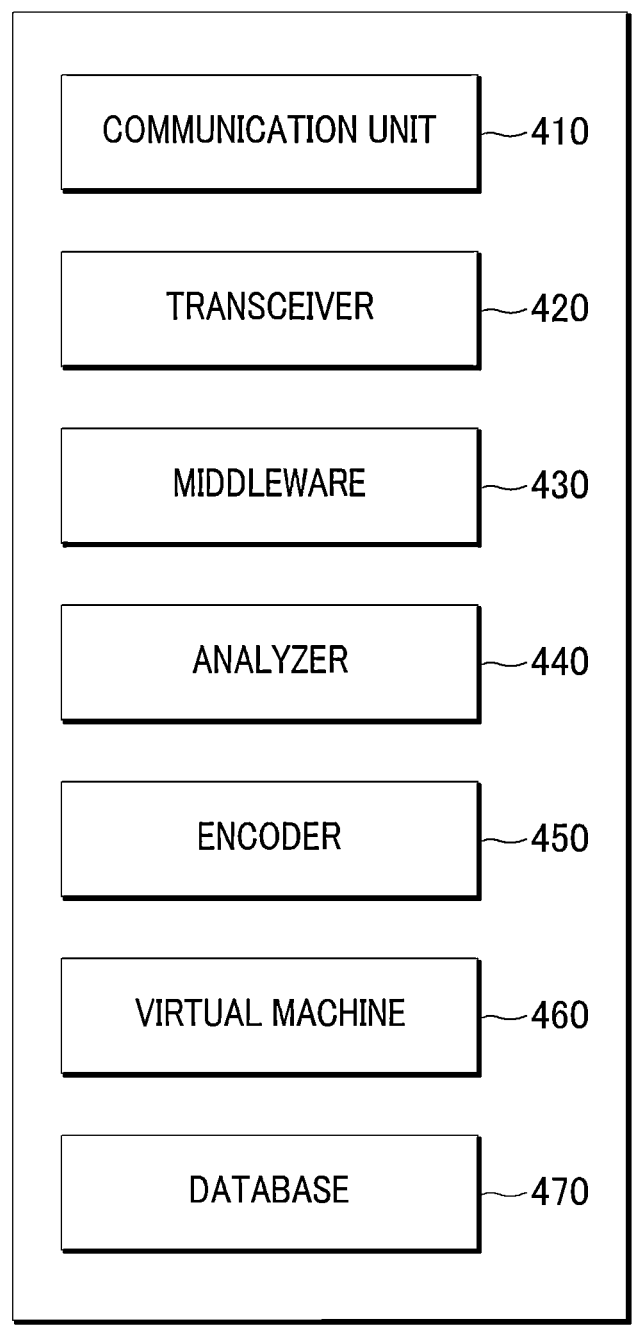
FIG. 4 shows an example configuration of a server on which an application may be executed, in accordance with embodiments described herein.

FIG. 4 shows an example configuration 400 of server 110 on which an application may be executed, in accordance with embodiments described herein. As depicted in FIG. 4, server 110, first described above with regard to FIG. 1, may include a communication unit 410, a transceiver 420, middleware 430, an analyzer 440, an encoder 450, a virtual machine 460 and a database 470.

Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of communication unit 410, transceiver 420, middleware 430, analyzer 440, encoder 450, virtual machine 460 and database 470 may be included in an instance of an application hosted by server 110.

Communication unit 410 may be a component or module that is programmed and/or configured to communicatively connect server 110 to television device 120. Communication unit 410 may generate a session connecting television device 120 to server 110. In some embodiments, the session may be generated by session server 130.

Transceiver 420 may be a component or module that is programmed and/or configured to receive a request to execute an application that uses at least one function of television device 120 from session server 130 via the generated session.

As referenced herein, the at least one function of television device 120 utilized by the application may be associated with broadcast content or video on demand (VOD) content to be played on television device 120. For example, the at least one function of television device 120 may include play, stop, volume up and volume down functions for the broadcast content, and play, pause, stop, rewind, fast forward, volume up and volume down functions for the VOD content.

Further, the at least one function of television device 120 utilized by the application may be associated with a peripheral device, such as an external data storage device, a USB(Universal Serial Bus) flash drive, or a camera, etc., coupled to television device 120.

In some embodiments, transceiver 420 may be further configured to transmit, to web server 132, a request for an "html" file associated with the application. Then, transceiver 420 may receive the "html" file from web server 132.

Middleware 430 may be a component or module that is programmed and/or configured to execute the application in response to the received request to execute the application, and to generate an image of the application. In some embodiments, middleware 430 may generate the image of the application by using a web engine, e.g., a web browser to render an HTML page corresponding to the received "html" file. Then, transceiver 420 may transmit the generated image.

That is, television device 120 may not be configured to execute an application. Such shortcoming may pertain to hardware, software, or firmware. Regardless, the request is for server 110 to serve as an execution proxy on behalf of television device 120.

In some embodiments, at least a portion of the generated image may be encoded. Analyzer 440 may be a component or module that is programmed and/or configured to divide the generated image to a plurality of sub-areas and classify each of the plurality of sub-areas into an invariable area or a variable area that includes the broadcast content or the VOD content for which frames per second (fps) exceed a predetermined fps value. Then, encoder 450 may be a component or module that is programmed and/or configured to encode the variable area appropriately to television device 120. In this case, transceiver 420 may transmit, to television device 120, the generated image by transmitting the encoded variable area and the non-encoded invariable area to television device 120.

Middleware 430 may be further configured to generate a request to execute the at least one function of television device 120, and transceiver 420 may transmit, to television device 120, the generated request to execute the at least one function of television device 120.

Middleware 430 may be further configured to apply a user input to the executed application when transceiver 420 receives the user input from television device 120. That is, the received user input may be applied to execution of the application at or by middleware 430 to generate and transmit, to television device 120, a subsequent image. As referenced herein, the user input may be associated with the execution of the application. Further, the user input may be associated with the at least one function of television device 120.

Virtual machine 460 may be a component or module that is programmed and/or configured to operate transceiver 420 and middleware 430. In some embodiments, virtual machine 460 may operate at least one of communication unit 410, transceiver 420, middleware 430, analyzer 440, and encoder 450.

Database 470 may be a component or module that is programmed and/or configured to store data, including data input to or output from the components of server 110. Non-limiting examples of such data may include the image which is generated by middleware 430.

Further, by way of example, database 470 may be embodied by at least one of a hard disc drive, a ROM (Read Only Memory), a RAM (Random Access Memory), a flash memory, or a memory card as an internal memory or a detachable memory of server 110.

In summary, television device 120 which is old-fashioned or low-performanced may be unable to host the web engine e.g., the web browser. Thus, television device 120 may not render, for itself, the HTML page by executing web content including the "html" file that is received from web server 132, so that server 110 may render the HTML page on behalf of television device 120 to generated the image.

Thus, FIG. 4 shows example configuration 400 of server 110 on which the application may be hosted and executed, in accordance with embodiments described herein.

Figure 5:
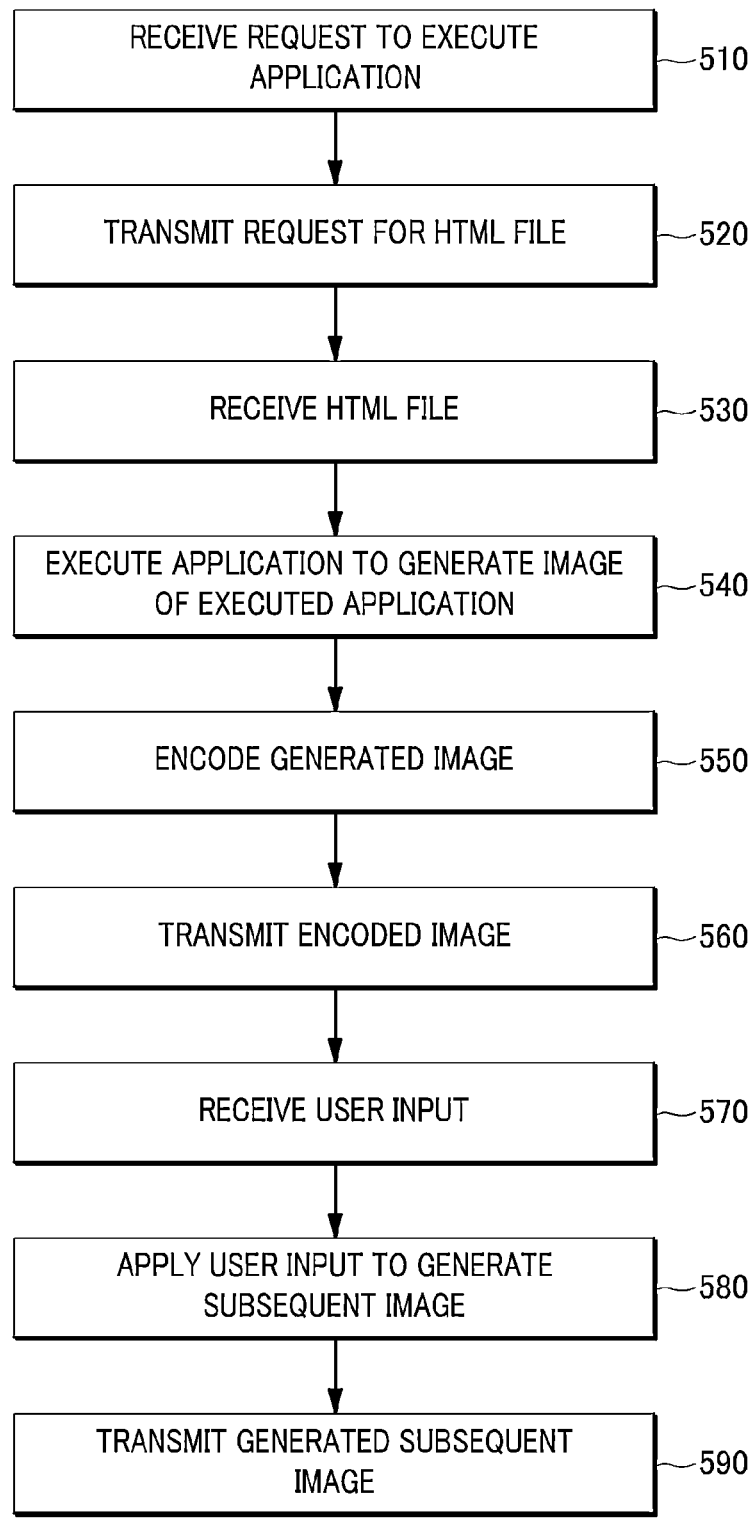
FIG. 5 shows an example processing flow of operations to transmit an image generated as a result of an executed application, in accordance with various embodiments described herein.

FIG. 5 shows an example processing flow 500 of operations to transmit an image generated as a result of an executed application, in accordance with various embodiments described herein.

The operations of processing flow 500 may be implemented in system configuration 100 including server 110, television device 120, session server 130, web server 132 and content provider 134 as illustrated in FIG. 1. Processing flow 500 may include one or more operations, actions, or functions as illustrated by one or more blocks 510, 520, 530, 540, 550, 560, 570, 580 and/or 590. Although illustrated as discrete blocks, various blocks may be divided into additional blocks, combined into fewer blocks, or eliminated, depending on the desired implementation. Processing may begin at block 510.

Block 510 (Receive Request to Execute Application) may refer to server 110 receiving a request to execute an application that uses at least one function of television device 120. Processing may proceed from block 510 to block 520.

Block 520 (Transmit Request for HTML File) may refer to server 110 transmitting a request an "html" file corresponding to the application to web server 132. Processing may proceed from block 520 to block 530.

Block 530 (Receive HTML File) may refer to server 110 receiving the requested "html" file from web server 132. Processing may proceed from block 530 to block 540.

Block 540 (Execute Application to Generate Image of Executed Application) may refer to server 110 executing the application to generate an image of the executed application. Further, server 110 may render the HTML page corresponding to the received "html" file to generate the image of the executed application. Processing may proceed from block 540 to block 550.

In some embodiments, if the application needs a function of television device 120, server 110 may transmit, to television device 120, a request to execute the function of television device 120, and receive, from television device 120, a result of the execution the function. Then, server 110 may generate the image of the execution application. As referenced herein, execution of the function by television device 120 may be required at or by server 110 to execute the application.

Block 550 (Encode Generated Image) may refer to server 110 encoding at least a portion of the generated image. For example, server 110 may divide the generated image to a plurality of sub-areas and classify each of the plurality of sub-areas into an invariable area or a variable area that includes broadcast content or VOD content for which frames per second (fps) exceed a predetermined fps value. Further, server 110 may encode the variable area, and does not encode the invariable area. Processing may proceed from block 550 to block 560.

Block 560 (Transmit Encoded Image) may refer to server 110 transmitting the encoded image to television device 120. Processing may proceed from block 560 to block 570.

Block 570 (Receive User Input) may refer to server 110 receiving a user input to the executed application from television device 120. Processing may proceed from block 570 to block 580.

Block 580 (Apply User Input to Generate Subsequent Image) may refer to server 110 applying the received user input to the executed application to generate subsequent image. Processing may proceed from block 580 to block 590.

Block 590 (Transmit Generated Subsequent Image) may refer to server 110 transmitting the generated subsequent image to television device 120.

In summary, television device 120 may not be configured to execute an application. Such shortcoming may pertain to hardware, software, or firmware. Regardless, the request is for server 110 to serve as an execution proxy on behalf of television device 120.

Thus, FIG. 5 shows example processing flow 500 of operations to transmit the image generated as a result of the executed application, in accordance with various embodiments described herein.

Figure 6:
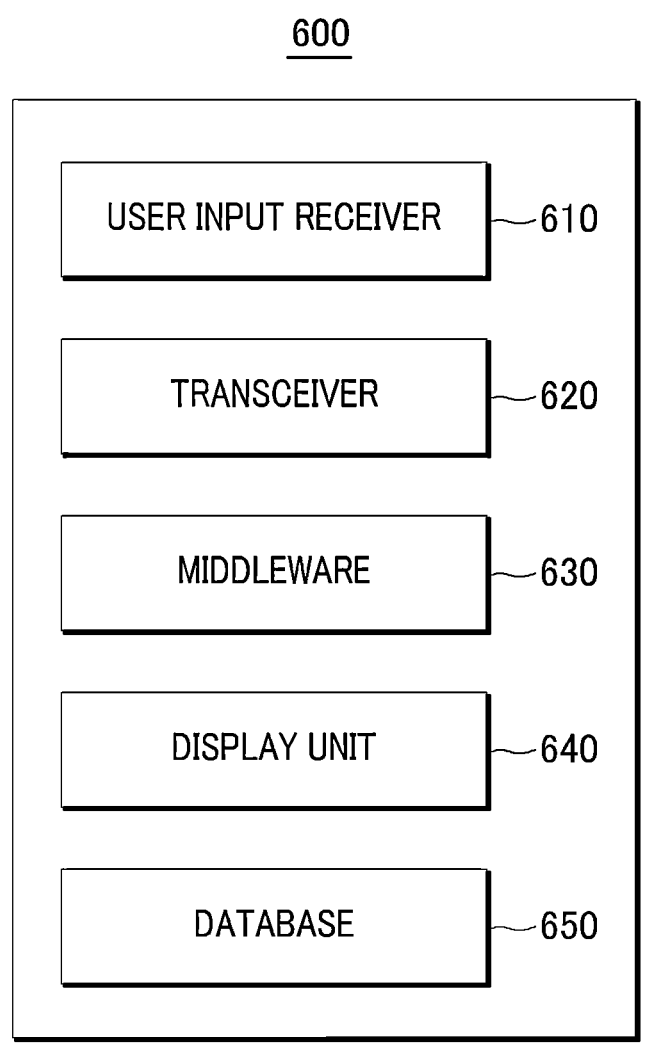
FIG. 6 shows an example configuration of a television device on which an application may be executed, in accordance with embodiments described herein.

FIG. 6 shows an example configuration 600 of television device 120 on which an application may be executed, in accordance with embodiments described herein. As depicted in FIG. 6, television device 120, first described above with regard to FIG. 1, may include a user input receiver 610, a transceiver 620, a middleware 630, a display unit 640 and a database 650.

Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of user input receiver 610, transceiver 620, middleware 630, display unit 640 and database 650 may be included in an instance of an application hosted by television device 120.

User input receiver 610 may be a component or module that is programmed and/or configured to receive a user input to execute an application that utilizes at least one function of the television device via a remote control device or a mouse or a keyboard coupled to television device 120.

As referenced herein, the at least one function of television device 120 utilized by the application may be associated with broadcast content or video on demand (VOD) content to be played on television device 120. For example, the at least one function of television device 120 utilized by the application may include play, stop, volume up and volume down functions for the broadcast content, and play, pause, stop, rewind, fast forward, volume up and volume down functions for the VOD content.

Further, the at least one function of television device 120 utilized by the application may be associated with a peripheral device, such as an external data storage device, a USB(Universal Serial Bus) flash drive, or a camera, etc., coupled to television device 120.

Transceiver 620 may be a component or module that is programmed and/or configured to transmit, to server 110 via session server 130, a request to execute the application. In some embodiments, transceiver 620 may directly transmit the request to execute the application to server 110 without going through session server 130.

Transceiver 620 may be further configured to receive, from server 110, a request to execute the at least one function of television device 120. As referenced herein, execution of the at least one function by middleware 630 may be required at or by server 110 to execute the application.

Middleware 630 may be a component or module that is programmed and/or configured to execute the at least one function of television device 120. Then, transceiver 620 may transmit a result of the execution by middleware 630 to server 110.

Display unit 640 may be a component or module that is programmed and/or configured to display an image when transceiver 620 receives, from server 110, the image generated by execution of the application at server 110.

In some embodiments, the received image may include at least one encoded variable area and at least one non-encoded invariable area, display unit 640 may be further configured to display the received image by combining the encoded broadcast content or VOD content included in the variable area and non-encoded invariable area.

In some embodiments, transceiver 620 may transmit, to server 110, a user input to the application when user input receiver 610 receives the user input to the application via the remote control device or the mouse or the keyboard. Then, transceiver 620 may receive, from server 110, a subsequent image to which the user input is applied, and display unit 640 may be further configured to display the received subsequent image on television device 120.

Database 650 may be a component or module that is programmed and/or configured to store data, including data input to or output from the components of server 110. Non-limiting examples of such data may include the image which is received by transceiver 620.

Further, by way of example, database 650 may be embodied by at least one of a hard disc drive, a ROM (Read Only Memory), a RAM (Random Access Memory), a flash memory, or a memory card as an internal memory or a detachable memory of television device 120.

Thus, FIG. 6 shows example configuration 600 of television device 120 on which the application may be hosted and executed, in accordance with embodiments described herein.

Figure 7:
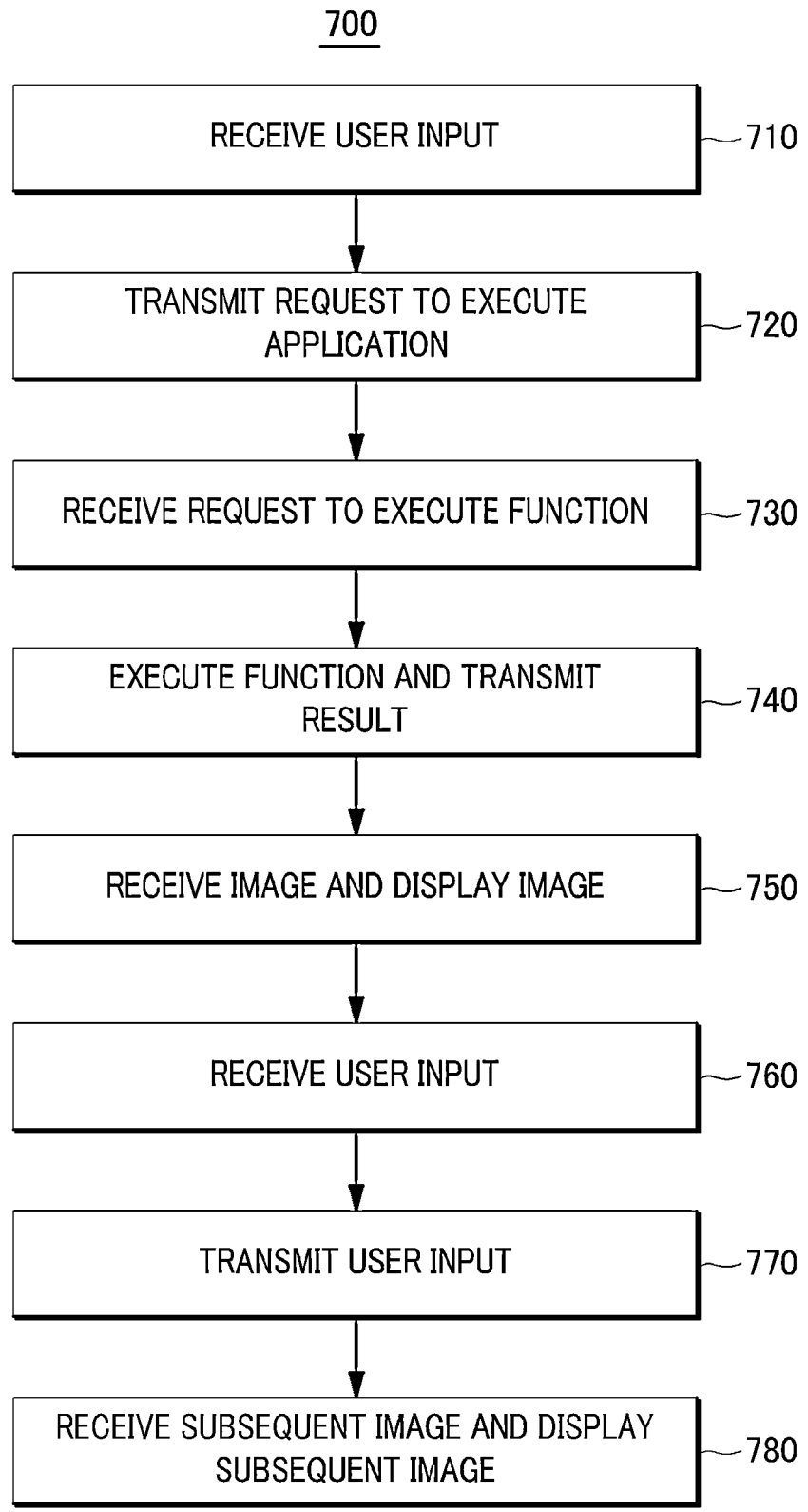
FIG. 7 shows an example processing flow of operations to receive an image generated as a result of an application, in accordance with various embodiments described herein.

FIG. 7 shows an example processing flow 700 of operations to receive an image generated as a result of an application, in accordance with various embodiments described herein.

The operations of processing flow 700 may be implemented in system configuration 100 including server 110, television device 120, session server 130, web server 132 and content provider 134 as illustrated in FIG. 1. Processing flow 700 may include one or more operations, actions, or functions as illustrated by one or more blocks 710, 720, 730, 740, 750, 760, 770, and/or 780. Although illustrated as discrete blocks, various blocks may be divided into additional blocks, combined into fewer blocks, or eliminated, depending on the desired implementation. Processing may begin at block 710.

Block 710 (Receive User Input) may refer to television device 120 receiving a user input that executes an application that uses at least one function of television device 120 via a remote control device or a mouse or a keyboard. Processing may proceed from block 710 to block 720.

Block 720 (Transmit Request to Execute Application) may refer to television device 120 transmitting a request to execute the application to server 110. Because television device 120 may not be configured to execute the application. Processing may proceed from block 720 to block 730.

Block 730 (Receive Request to Execute Function) may refer to television device 120 receiving a request to execute the at least one function of television device 120. Processing may proceed from block 730 to block 740. As referenced herein, execution of the at least one function by television device 120 may be required at or by server 110 to execute the application.

Block 740 (Execute Function and Transmit Result) may refer to television device 120 executing the at least one requested function of television device 120. Further, television device 120 may transmit a result of the execution to server 110. Processing may proceed from block 740 to block 750.

Block 750 (Receive Image and Display Image) may refer to television device 120 receiving an image of the application from server 110 and display the received image. Processing may proceed from block 750 to block 760.

Block 760 (Receive User Input) may refer to television device 120 receiving a user input to the executed application via the remote control device or the mouse or the keyboard. Processing may proceed from block 760 to block 770.

Block 770 (Transmit User Input) may refer to television device 120 transmitting the user input to the executed application to server 110. Processing may proceed from block 770 to block 780.

Block 780 (Receive Subsequent Image and Display Subsequent Image) may refer to television device 120 receiving a subsequent image from server 110, and display the received subsequent image. As referenced herein, the user input to the executed application may be applied to the subsequent image.

Thus, FIG. 7 shows example processing flow 700 of operations to receive the image generated as a result of the application, in accordance with various embodiments described herein.

Figure 8:
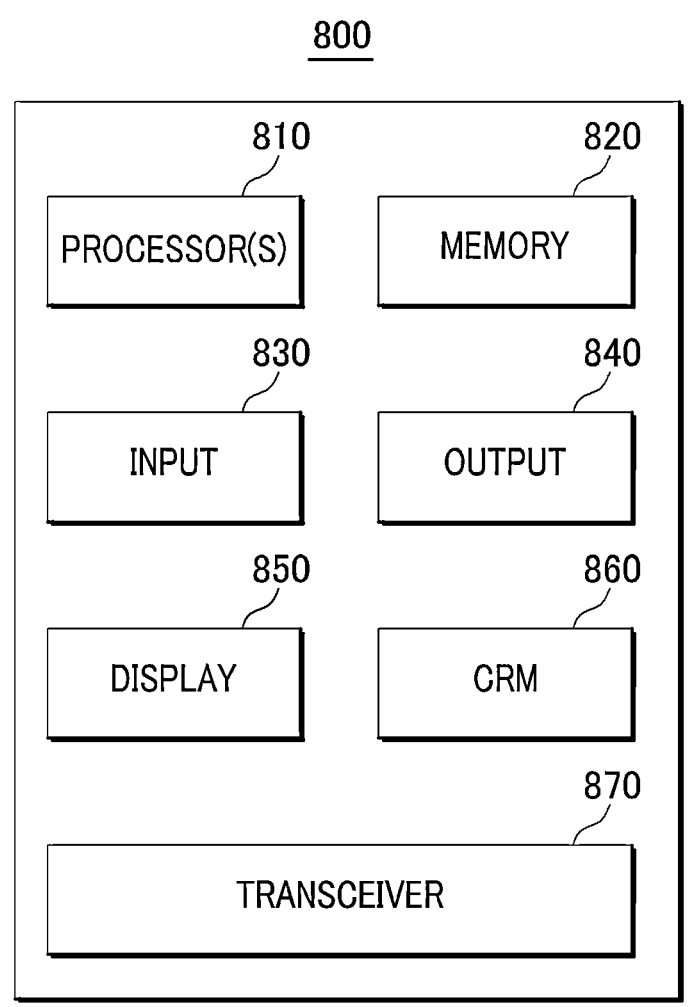
FIG. 8 shows an illustrative computing embodiment, in which any of the processes and sub-processes of hosting and executing an application may be implemented as computer-readable instructions stored on a computer-readable medium, in accordance with embodiments described herein.

FIG. 8 shows an illustrative computing embodiment, in which any of the processes and sub-processes of hosting and executing an application may be implemented as computer-readable instructions stored on a computer-readable medium, in accordance with embodiments described herein. The computer-readable instructions may, for example, be executed by a processor of a device, as referenced herein, having a network element and/or any other device corresponding thereto, particularly as applicable to the applications and/or programs described above corresponding to the example system configuration 100 for transactional permissions.

In a very basic configuration, a computing device 800 may typically include, at least, one or more processors 810, a system memory 820, one or more input components 830, one or more output components 840, a display component 850, a computer-readable medium 860, and a transceiver 870.

Processor 810 may refer to, e.g., a microprocessor, a microcontroller, a digital signal processor, or any combination thereof.

Memory 820 may refer to, e.g., a volatile memory, non-volatile memory, or any combination thereof. Memory 820 may store, therein, an operating system, an application, and/or program data. That is, memory 820 may store executable instructions to implement any of the functions or operations described above and, therefore, memory 820 may be regarded as a computer-readable medium.

Input component 830 may refer to a built-in or communicatively coupled keyboard, touch screen, or telecommunication device. Alternatively, input component 830 may include a microphone that is configured, in cooperation with a voice-recognition program that may be stored in memory 830, to receive voice commands from a user of computing device 800. Further, input component 820, if not built-in to computing device 800, may be communicatively coupled thereto via short-range communication protocols including, but not limitation, radio frequency or Bluetooth.

Output component 840 may refer to a component or module, built-in or removable from computing device 800, that is configured to output commands and data to an external device.

Display component 850 may refer to, e.g., a solid state display that may have touch input capabilities. That is, display component 850 may include capabilities that may be shared with or replace those of input component 830.

Computer-readable medium 860 may refer to a separable machine readable medium that is configured to store one or more programs that embody any of the functions or operations described above. That is, computer-readable medium 860, which may be received into or otherwise connected to a drive component of computing device 800, may store executable instructions to implement any of the functions or operations described above. These instructions may be complimentary or otherwise independent of those stored by memory 820.

Transceiver 870 may refer to a network communication link for computing device 800, configured as a wired network or direct-wired connection. Alternatively, transceiver 870 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A system comprising:
a television device configured to:
    transmit a request to execute an application configured to display media content to a server; and
    transmit an internet address of the media content to the server; and
wherein the server configured to:
    receive the media content from a web server according to the internet address;
    execute the application on a web-browser of the server which uses at least one function of the television device;
    generate an image of the executed application including the media content displayed on the application;
    divide the generated image into a plurality of sub-areas;
    classify each of the plurality of sub-areas as at least one of an invariable area or as a variable area based on frames per second (fps) corresponding to portions of the displayed media content on the application,
        wherein the invariable area is a portion of the generated image and the variable area is another portion of the generated image, and
        wherein the invariable area is not overlaid on the variable area;
    encode the variable area;
    transmit the encoded variable area and the invariable area to the television device; and
    transmit a request to execute the at least one function of the television device, and
wherein the television device is further configured to:
    execute the requested function of the television device, and
    transmit a result of the execution to the server.

2. The system of claim 1, wherein the at least one function of the television device is associated with broadcast content or video on demand (VOD) content to be played on the television device.

3. The system of claim 1, wherein the at least one function of the television device is associated with a peripheral device coupled to the television device.

4. The system of claim 1, further comprising:
a session server configured to select the server from among a plurality of servers to generate a session connecting the television device to the server.

5. The system of claim 4, wherein the television device is further configured to transmit, to the session server, the request to execute the application, and
wherein the session server is further configured to transmit, to the server, the request to execute the application.

6. The system of claim 1, wherein the television device is further configured to receive a user input to the application, and to transmit the user input to the server, and
wherein the server is further configured to receive the user input, and wherein the execution of the application is associated with the user input.

7. The system of claim 2, wherein the variable area includes the broadcast content or the VOD content for which frames per second (fps) exceed a predetermined threshold fps value.

8. The system of claim 7, wherein the server further comprises:
an encoding server configured to:
    encode the broadcast content or the VOD content included in the variable area; and
    transmit the encoded broadcast content or the encoded VOD content included in the encoded variable area to the television device.

9. The system of claim 8, wherein the television device is further configured to:
receive the encoded broadcast content or the encoded VOD content included in the encoded variable area;
receive the invariable area from the server; and
combine the encoded variable area and the invariable area.

10. The system of claim 2, wherein the at least one function of the television device includes play and stop functions for the broadcast content, and play, pause, stop, rewind, and fast forward functions for the VOD content.

11. The system of claim 3, wherein the peripheral device includes a data storage device or a camera.

12. A server, comprising:
a transceiver configured to:
    receive a request to execute an application configured to display a media content that uses at least one function of a television device from the television device,
    receive an internet address of the media content from the television device, and
    receive the media content from a web server according to the internet address;
middleware configured to:
    execute the application on a web-browser of the server,
    generate an image of the executed application including the media content displayed on the application, and
    generate a request to execute the at least one function of the television device;
an analyzer configured to:
    divide the generated image into a plurality of sub-areas, and
    classify each of the plurality of sub-areas as at least one of an invariable area or as a variable area based on frames per second (fps) corresponding to portions of the displayed media content on the application,
        wherein the invariable area is a portion of the generated image and the variable area is another portion of the generated image, and
        wherein the invariable area is not overlaid on the variable area; and
an encoder configured to encode the variable area, and
    wherein the transceiver is further configured to transmit, to the television device, the encoded variable area and the invariable area and the request to execute the at least one function.

13. The server of claim 12, further comprising:
a virtual machine configured to operate the transceiver and the middleware.

14. The server of claim 12, further comprising:
a communication unit configured to communicatively connect the server to the television device, and
wherein the transceiver is further configured to receive the request to execute the application from the session server.

15. The server of claim 12, wherein the transceiver is further configured to receive, from the television device, a user input for the application, and
wherein the middleware is further configured to apply the user input to the application.

16. The server of claim 12, wherein the variable area includes broadcast content or VOD content for which frames per second (fps) exceed a predetermined fps value.

17. The server of claim 16, wherein the encoder is configured to encode the broadcast content or the VOD content included in the variable area.

18. A television device, comprising:
a user input receiver configured to receive a user input to execute an application that utilizes at least one function of the television device;
a transceiver configured to:
  transmit a request, to a server, to execute the application configured to display a media content;
  transmit an internet address of the media content to the server,
    wherein the media content is sent from a web server to the server according to the internet address
  receive, from the server, an image generated by execution of the application on a web-browser of the server including the media content displayed on the application and a request to execute the at least one function of the television device, and
a display unit configured to display the received image,
  wherein the image includes at least one encoded variable area and at least one invariable area,
  wherein the image is divided into a plurality of sub-areas, and each of the plurality of sub-areas is classified as one of the at least one invariable area or the at least one variable area by the server based on frames per second (fps) corresponding to portions of the displayed media content on the application,
  wherein the at least one invariable area is a portion of the generated image and the at least one variable area is another portion of the generated image, and
  wherein the at least one invariable area is not overlaid on the at least one variable area.

19. The television device of claim 18, further comprising:
middleware configured to execute the at least one function of the television device, and
wherein the transceiver is further configured to transmit a result of the execution by the middleware to the server.

20. The television device of claim 18, wherein the display unit is further configured to display the image by combining the encoded broadcast content or VOD content included in the encoded variable area and the invariable area.

* * * * *